United States Patent [19]

Bakka et al.

[11] Patent Number: 4,838,744
[45] Date of Patent: Jun. 13, 1989

[54] INTERMODAL SYSTEM FOR TRANSPORTING A SEMI-TRAILER ON TWO RAILWAY VEHICLES

[75] Inventors: Charles M. Bakka, Chicago, Ill.; Roger D. Sims, Munster; James T. Stevenson, Hammond, both of Ind.

[73] Assignee: Trailer P. H. Corporation, Chicago, Ill.

[21] Appl. No.: 181,207

[22] Filed: Apr. 13, 1988

[51] Int. Cl.⁴ ............................................. B60F 1/04
[52] U.S. Cl. ...................................... 410/53; 410/56; 105/159
[58] Field of Search ..................... 410/47, 48, 49, 50, 410/53–55, 56, 57, 96, 97, 117, 120, 130, 150; 105/159, 215.2

[56] References Cited

U.S. PATENT DOCUMENTS

| | | | |
|---|---|---|---|
| 3,834,322 | 9/1974 | Meier et al. | 410/53 |
| 3,841,511 | 10/1974 | Haun | 410/54 |
| 4,416,571 | 11/1983 | Krause | 410/53 |
| 4,574,707 | 3/1986 | Hickman . | |
| 4,654,966 | 3/1987 | Bakka et al. . | |
| 4,665,834 | 5/1987 | van Iperen . | |
| 4,671,714 | 6/1987 | Bennett . | |
| 4,685,399 | 8/1987 | Baker . | |
| 4,686,907 | 8/1987 | Woollam et al. | 410/56 |
| 4,688,140 | 5/1987 | Blunden . | |

OTHER PUBLICATIONS

G-85 Piggy-Back Car, General American Transportation Corp., Chicago, IL, 10/24/62.

Primary Examiner—Sherman D. Basinger
Assistant Examiner—Stephen P. Avila
Attorney, Agent, or Firm—Dressler, Goldsmith, Shore Sutker & Milnamow, Ltd.

[57] ABSTRACT

An intermodal system for moving highway semi-trailers by rail transportation. With the system of the present invention, trailers of any length are carried on a plurality of rail bogies such that one end of the semi-trailer is carried by one rail bogie and the other end of the semi-trailer is carried by another rail bogie. Each rail bogie has a frame structure supported on spaced-apart, wheeled axles. The frame structure defines a central drop deck section having a stationary, longitudinally extended, planar platform. Each rail bogie further includes a trailer securement system. The trailer securement system includes a chock assembly for facilitating trailer loading through simultaneous rotational movement of the semi-trailer's wheels through an arc on the platform and translatory movement of the wheels along a predetermined longitudinal path on the platform. The chock assembly includes a transversely spaced pair of joined chock blocks normally arranged on one side of the semi-trailer's wheels. Each of those chock blocks includes apparatus for securing the chock blocks relative to the platform. The chock assembly further includes an apparatus for positioning the chock assembly on the platform. The securement system includes at least two other separate and independent chock blocks each of which include apparatus for securing each of those chock blocks relative to the platform on an opposite side of the semi-trailer's wheels. The present invention further presents a method for forming a consist comprising a highway semi-trailer supported between first and second rail bogies.

22 Claims, 9 Drawing Sheets

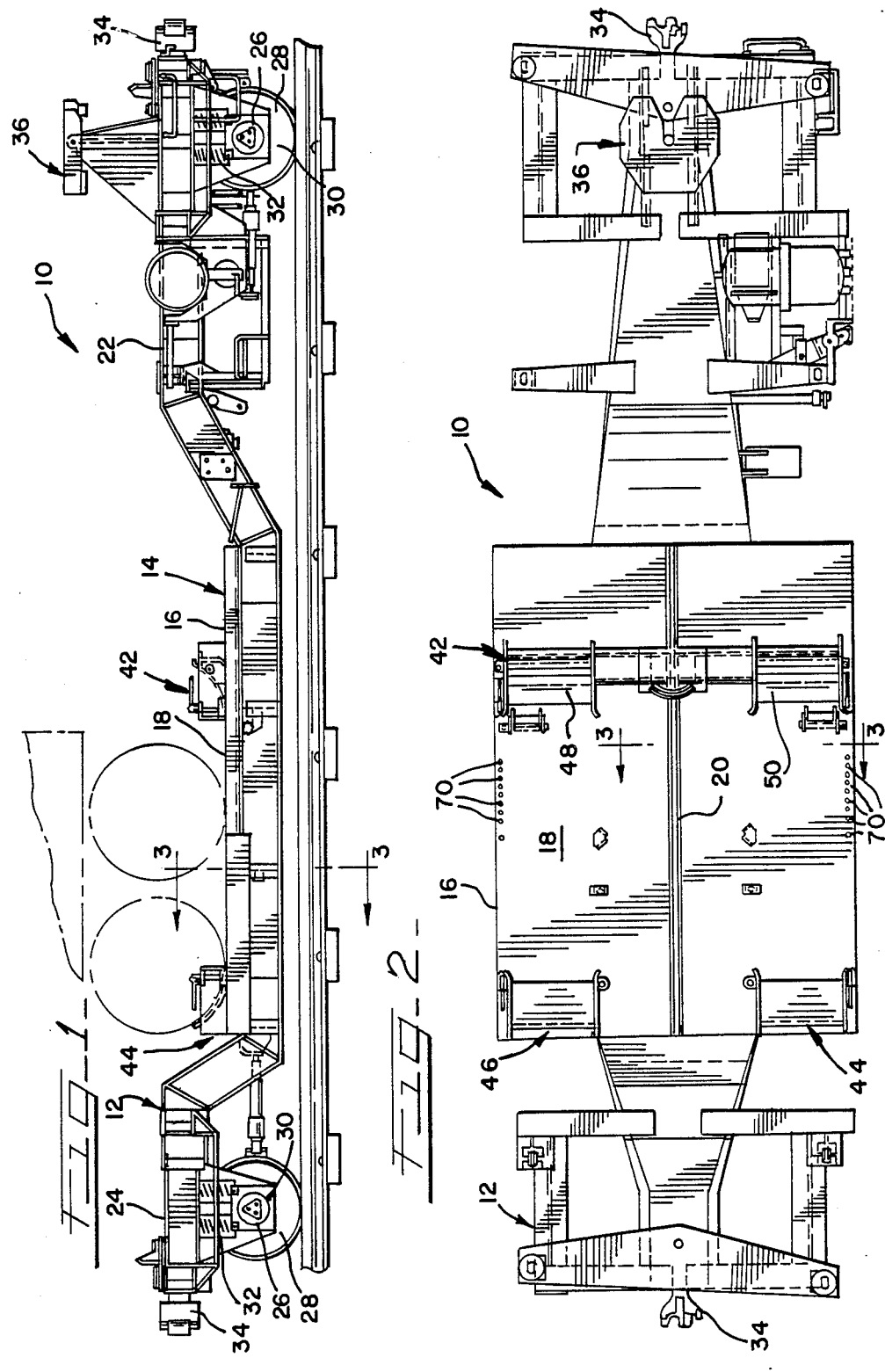

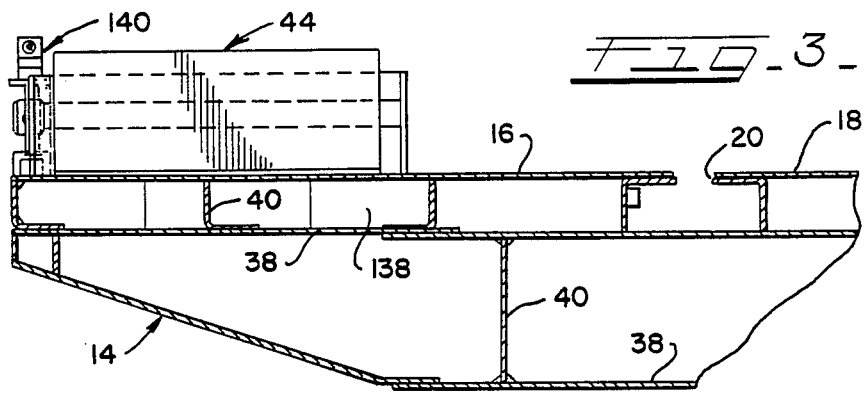
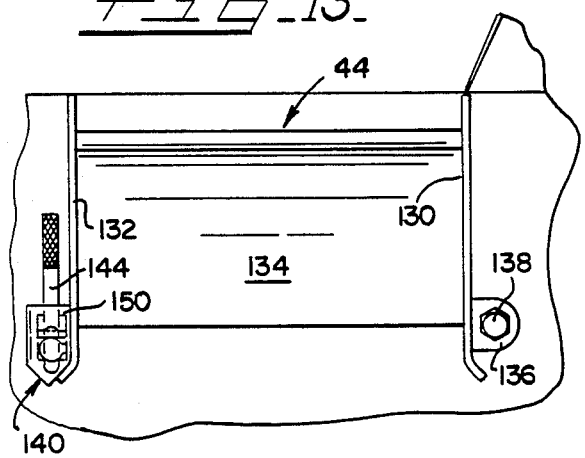
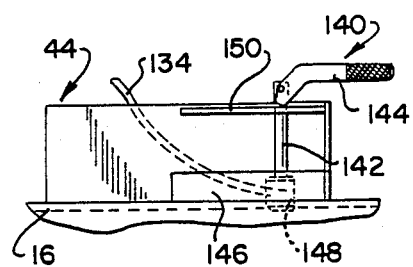
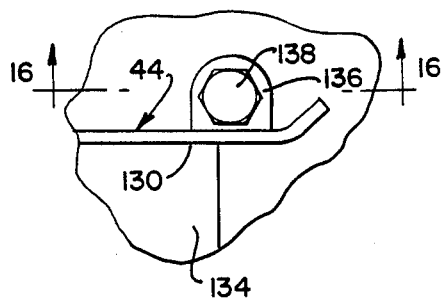
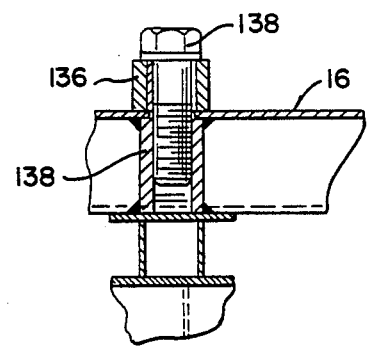

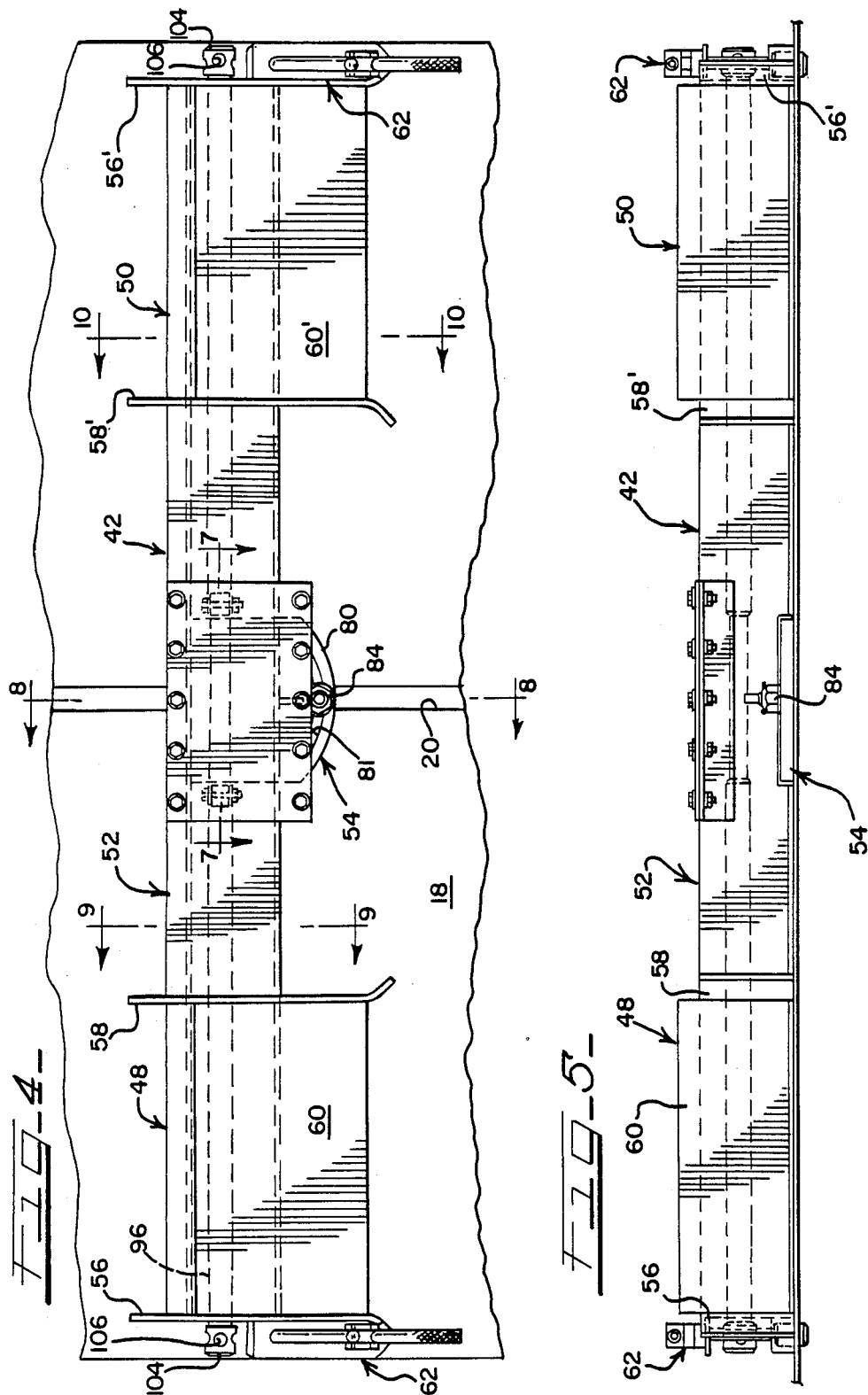

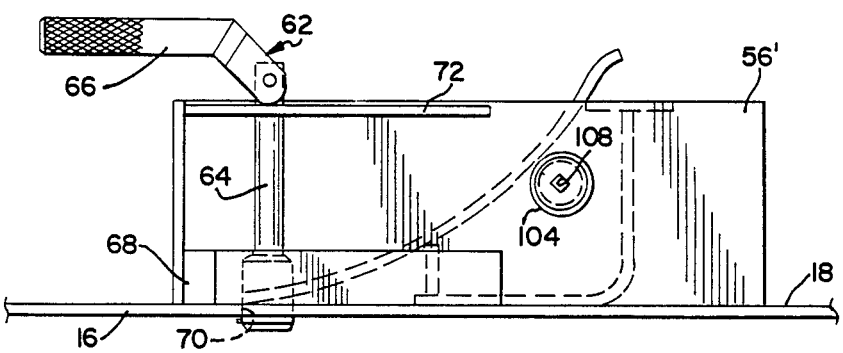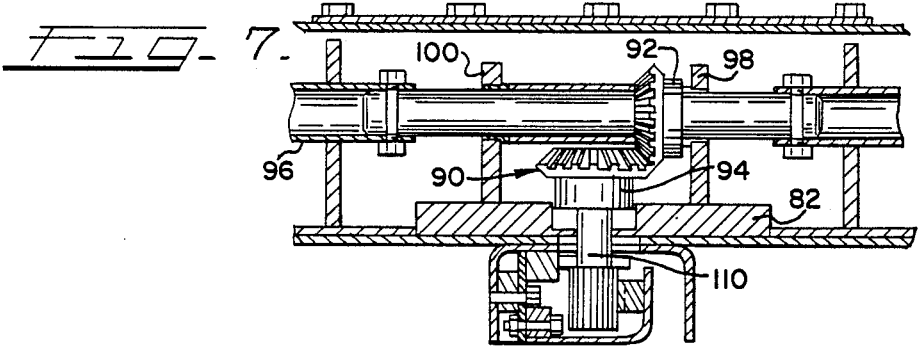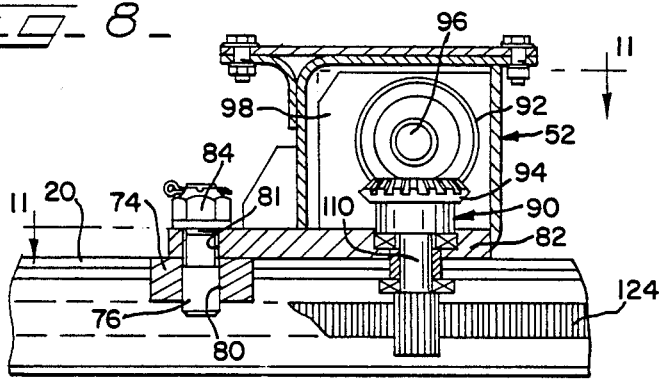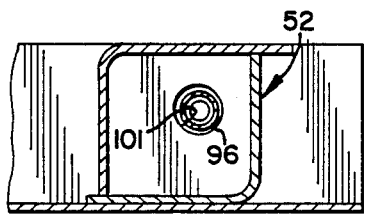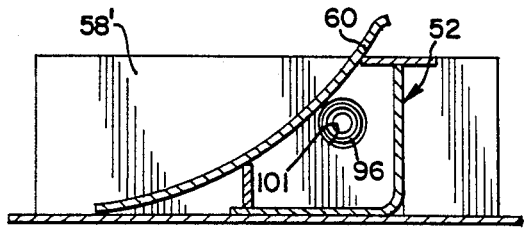

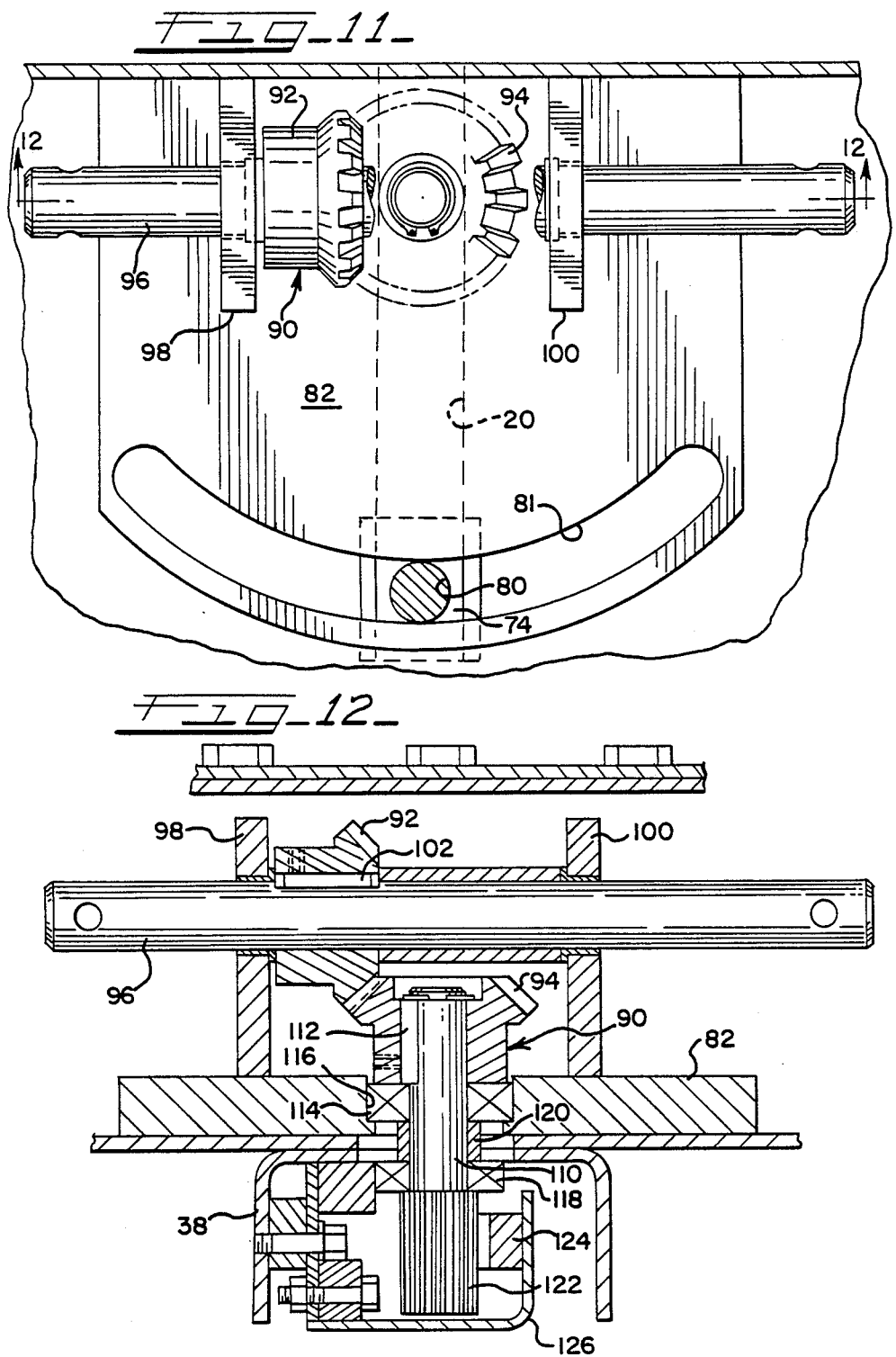

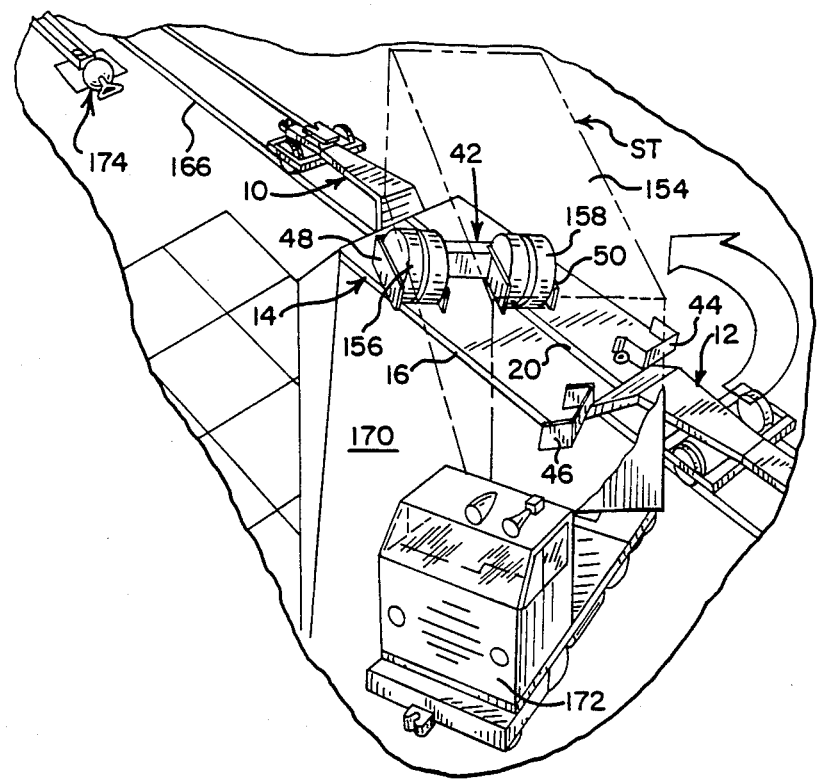
FIG_17_
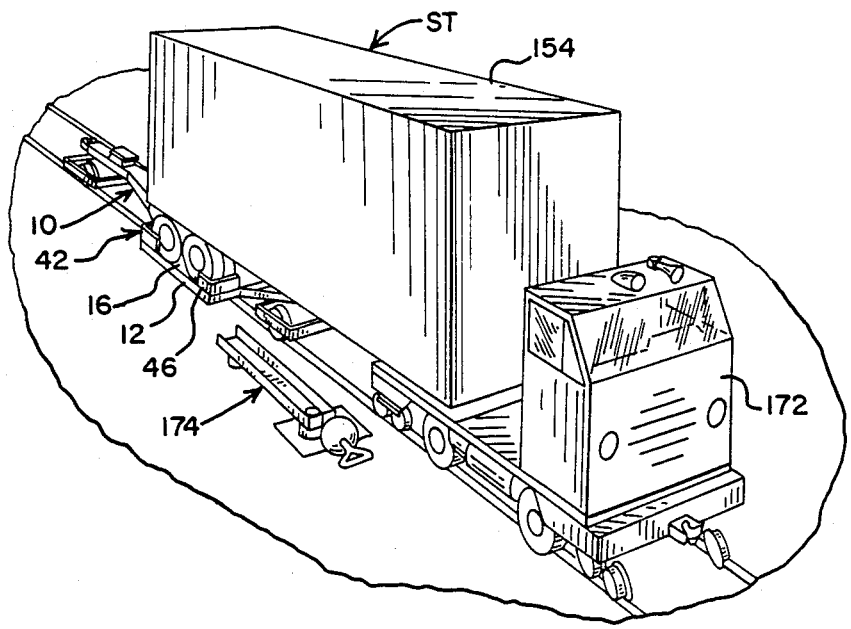
FIG_18_

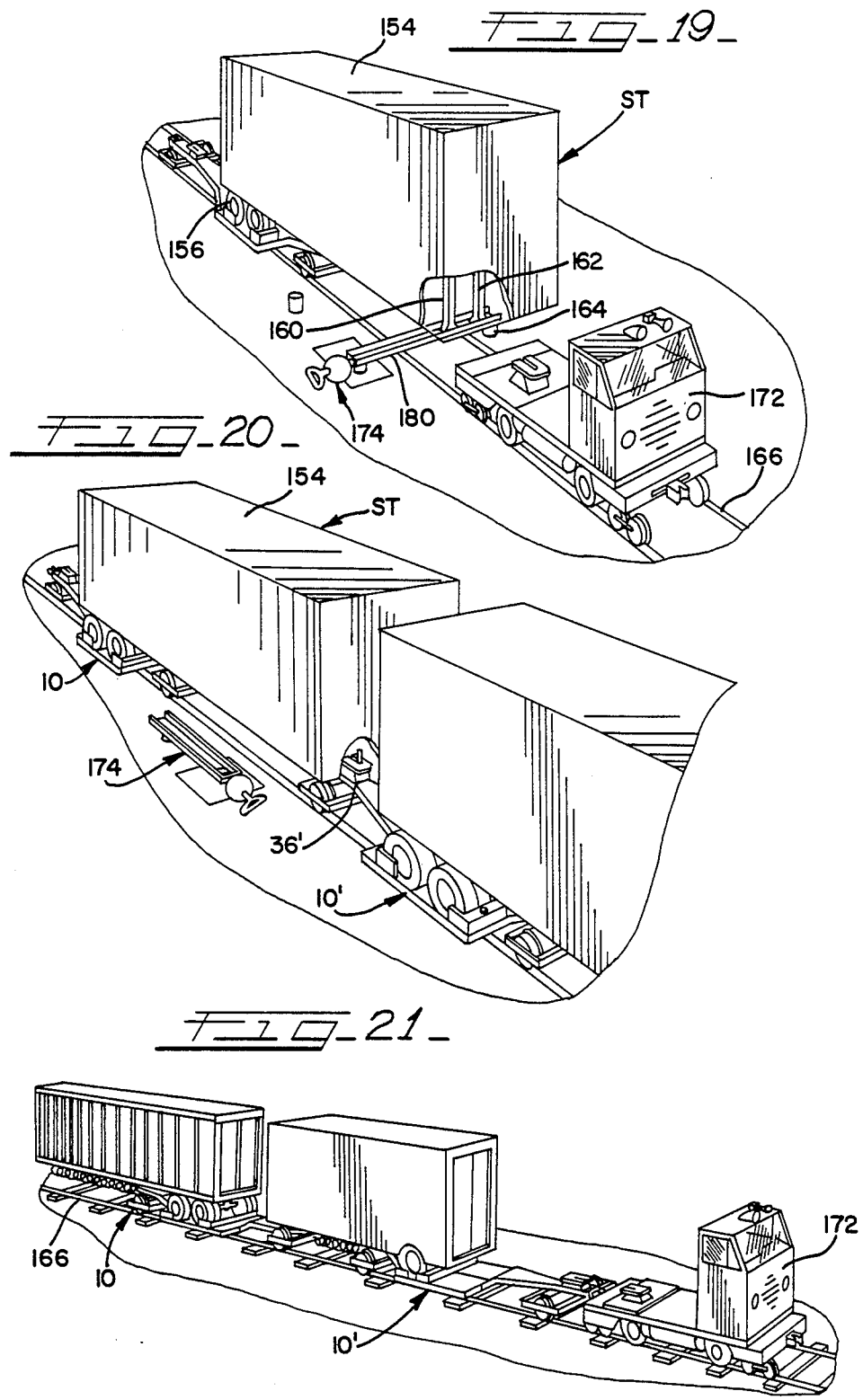

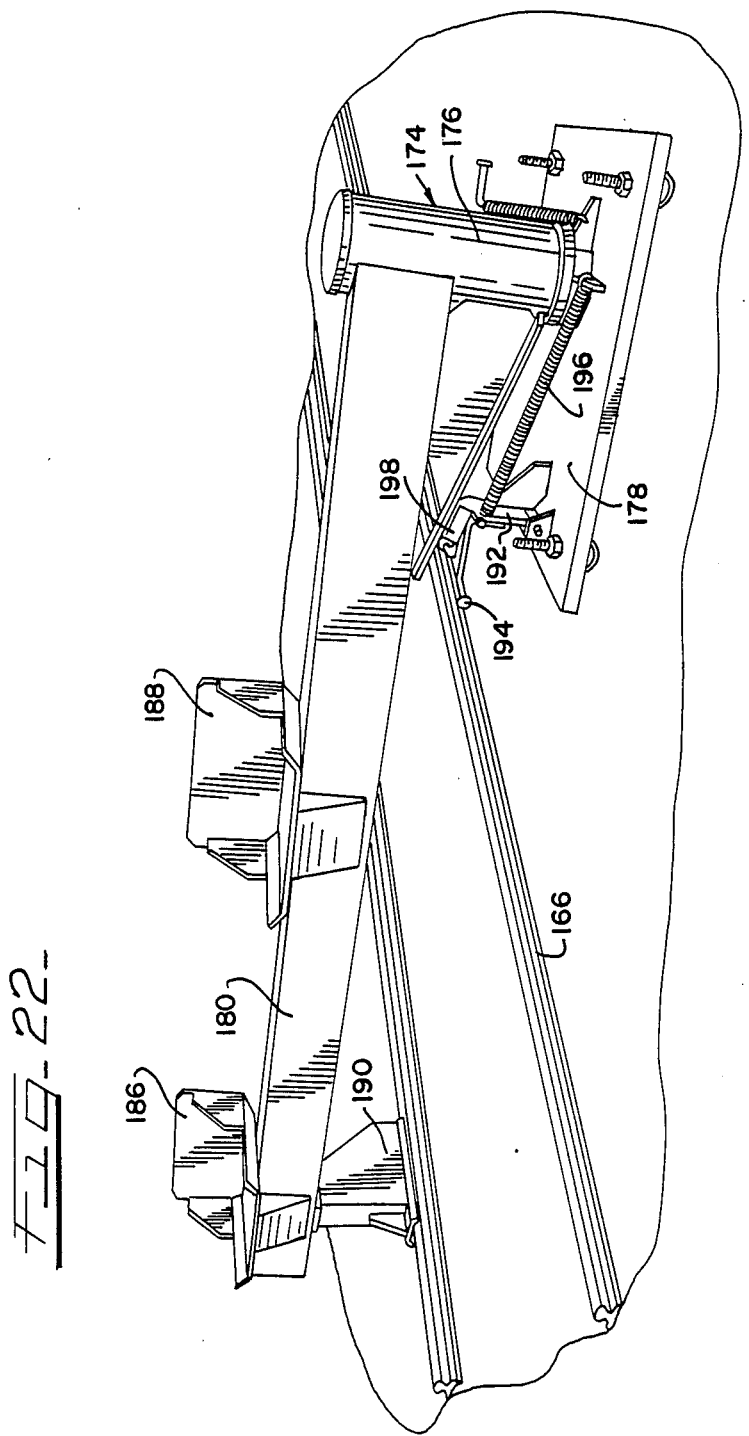

INTERMODAL SYSTEM FOR TRANSPORTING A SEMI-TRAILER ON TWO RAILWAY VEHICLES

TECHNICAL FIELD

The present invention generally relates to railway rolling stock and, more particularly, to a system for transporting highway semi-trailers, and the like, by rail.

BACKGROUND OF THE INVENTION

Several systems have been proposed to implement intermodal transfer over long distances as a commercially viable alternative to wholly road freight services which are available. Such systems include "piggy back" transport of road semi-trailers, complete lorries, or other land-moving vehicles on conventional railroad flat cars of sufficient length to support the length of one or two of such vehicles or containers.

The cost advantage enjoyed by long distance rail transportation of semi-trailers and the like on railroad flat cars is well known and recognized by industry. It has been recognized, however, that there are inefficiencies inherent in the basic concept of transporting semi-trailers or the like on railway flat cars for shorter distances, i.e., less than 500 miles.

The inability of railroads to effectively compete in a shorter distance market stems from two factors. The first factor involves the problem of matching the lengths of the semi-trailers to the flat cars. Although flat cars are available in lengths ranging from 40 feet to 90 feet and more, a fairly significant number are in the 80 to 90 feet range. Semi-trailers are also available in a variety of lengths, but a significant number are in the 40 to 50 feet range. Thus, it is fairly common that semi-trailers must be transported one on one because they are too long for double, tandem loading on available flat rolling stock. Thus, except where the railroad flat cars are matched with semi-trailers either approximately equal to or approximately half their lengths, piggy back transportation of semi-trailers tends to be somewhat inefficient because relatively large amounts of space are wasted and unoccupied in one-on-one loadings.

The second problem concerns the prohibitive capital costs and operating expenses associated with the loading of trailers on today's railroad flat cars. Because of terminal costs associated with loading and unloading the trailers on flat cars, railroads find it difficult to absorb such terminal costs while remaining competitive with road freight services.

U.S. Pat. No. 4,653,966, assigned to the same assignee as instant application, discloses a unique system for transporting highway semi-trailers, or the like, by rail. Such system uses improved rail bogies as the sole support of adjacent rear and front ends of the trailer and as the sole connecting means between such trailers, to form trains.

The patented system includes a rail bogie having a frame structure supported on wheeled axles positioned at the respective ends of the frame structure. The frame structure defines a pair of end deck surfaces positioned above the wheeled axles and a central drop deck surface disposed between and below the end deck surfaces. A fifth wheel assembly is supported above each of the end deck surfaces for receipt of a kingpin of a semi-trailer. A deck plate member is pivotally secured to the drop deck surface for planar rotation with respect thereto about a substantially vertical axis. A pair of transversely spaced, longitudinally extending, internal and external rub rail members extend upwardly from the drop deck plate member for receipt of semi-trailer tandems therebetween.

As disclosed, the drop deck plate is movable between first and second positions. In one position, the rub rail members on the deck plate are substantially parallel to the longitudinal axis of the frame structure. When in its second position, the rub rail members on the deck plate member are substantially perpendicular to the longitudinal axis of the frame structure.

In accordance with that system, a semi-trailer extends between a pair of adjacent bogies. The tandems of the trailer are received and supported on the drop deck plate between the corresponding rub rail members of a first bogie and the kingpin of the trailer is received and supported on the fifth wheel assembly of the immediately adjacent bogie. The procedure for loading and unloading the semi-trailers onto and from the bogies is facilitated by the rotating drop deck plate.

The system as disclosed in U.S. Pat. No. 4,653,966 has improved upon the prior system in that it allows for the straddling of a semi-trailer between two bogies or short flat cars, thus permitting the trailer frame rails to distribute longitudinal stress. Also, this system provides a timely procedure for loading and unloading the semi-trailers onto and from the bogies.

This system, however, is limited in its ability to secure a semi-trailer against endwise displacement relative to the deck plate member. Separate devices need to be provided to secure the semi-trailer tandems relative to the deck plate. Should such securement devices become dislodged during transportation, a trailer may be allowed or permitted an unwanted freedom of movement relative to the deck plate.

SUMMARY OF THE INVENTION

In view of the above, and in accordance with the present invention, there is provided a system for transporting by rail a highway semi-trailer, or the like. In accordance with this invention, a front end of the semi-trailer is supported by and connected to a first rail bogie. The semi-trailer's rubber-tired, wheeled end is supported by and connected to a second rail bogie. The system of the present invention permits hauling of any conventional highway trailer from 28 to 60 feet in length. Moreover, the structure of each rail bogie lends itself to simple and shortened loading and unloading procedures.

A salient feature of the present system is a rail bogie having a drop deck frame structure supported on wheeled axles positioned adjacent opposite ends of the frame structure. The frame structure defines a central drop deck section having a stationary, longitudinally extended, planar platform defining an upper surface for supporting the highway wheels of a semi-trailer. Standard railroad car couplers are provided at opposite ends of the frame structure.

Each rail bogie of the present invention further includes its own trailer securement system comprising a chock assembly normally arranged on one side of the semi-trailer's wheels and at least two separate and independent chock block means arranged on an opposite side of the semi-trailer's wheels. During the loading procedure, the chock assembly facilitates simultaneous rotational movement of the semi-trailer's wheels through an arc on the platform and translatory movement of the wheels along a predetermined longitudinal path on the platform.

The chock assembly includes a transversely spaced pair of joined chock block means each of which includes securement devices for holding the chock block means stationary relative to the platform in a manner securing the semi-trailer's wheels against movement in a first longitudinal direction. The chock assembly further includes a positioning apparatus for limiting movement of the chock assembly on the platform about a substantially vertical axis and along a predetermined longitudinal path.

Each of the separate and independent chock block means include securement devices for holding them stationary relative to the platform on the opposite side of the semi-trailer's wheels. Each of these separate chock block means secure the semi-trailer's wheels against movement in a second longitudinal direction.

In a preferred form of the invention, the drop deck frame structure of each rail bogie further defines end dec surfaces positioned above the wheeled axles. In such structure, the planar platform defined by the central drop section is disposed beneath the end deck surfaces and between the wheeled axles. At least one of the end deck surfaces on the frame structure has a fifth wheel assembly supported thereabove.

An expedient embodiment of the present invention has a chock assembly which includes a transverse beam structure for joining the pairs of chock block means to opposite ends thereof. Each of the chock block means of the chock assembly includes a pair of transversely spaced, longitudinally extending members defining inner and outer parallel rub rail members.

In a prefered form, each securement device on the chock assembly includes a pin which engages with an aperture or hole defined by the platform. A cammed handle is connected to the pin and controls its operative effectiveness. The platform preferably defines a plurality of holes arranged in a longitudinally extended line which permit the trailer securement system to be adaptable to trailers having various length tandums.

The positioning apparatus of the chock assembly includes a pivot pin which is slidably received in a longitudinally extending track. This track defines a predetermined path of longitudinal movement of the chock assembly and is defined on the platform.

The positioning apparatus further includes an apparatus for drivably moving the chock assembly with the joined pair of chock block means in either longitudinal direction along the track. The driving apparatus, in a preferred form of the invention, includes a rack and pinion arrangement. Such rack and pinion arrangement further includes operator-controlled means for longitudinally positioning the chock assembly on the platform. In a preferred embodiment, the rack is secured to the platform and the pinion is secured to the chock assembly. The positioning apparatus further includes positive stops for limiting planar rotation of the chock assembly relative to the platform.

According to a preferred embodiment, each separate and independent chock block means is pivotally secured to the platform. Moreover, each separate and independent chock block includes a pair of transversely spaced, longitudinally extending members defining inner and outer rub rail members.

The present invention further concerns a method for forming a consist comprising a highway semi-trailer whose body is lengthwise supported between two rail bogies of the above-described type. The semi-trailer body has a first end defined by left and right rubber-tired wheels arranged on opposite sides of the trailer body. A second end of the trailer body is defined by a pair of trailer landing legs and a kingpin suspended from the trailer body.

The method for forming the consist involves an initial step of loading the semi-trailer onto a first rail bogie. The trailer is loaded such that the trailer body thereof is substantially aligned with the longitudinal axis of the frame section and has rubber-tired wheels thereof on the stationary platform with its second end longitudinally extending past an end of the first rail bogie.

As described above, the rail bogie includes a chock assembly into which the left and right trailer wheels fit. During loading, the chock assembly facilitates simultaneous rotational movement of the wheels through an arc on the platform and translatory movement of those wheels along a predetermined longitudinal path during semi-trailer loading.

In a preferred method, loading of the semi-trailer according to the present invention further comprises a step of positioning the first rail bogie with its central drop deck frame on a railway section relative to a terminal area with a ramp. The railway section extends along a substantially straight line path and adjacent the terminal area.

Loading of the semi-trailer further includes the steps of moving the first end of the semi-trailer up the terminal area ramp at an acute angle relative to the railway section until the trailer's wheels fit into the chock assembly. Thereafter, the trailer body is turned into substantial alignment with the longitudinal axis of the frame section of the rail bogie while simultaneously moving the first rail bogie and the trailer body. It should be appreciated, however, that the first rail bogie is held against moving relative to the railway section until the wheels fit into the chock assembly.

After the semi-trailer is substantially aligned with the longitudinal axis of the frame section, the first rail bogie and the semi-trailer are moved until the trailer's landing legs are positioned to be supported by a stanchion provided adjacent the railway section. The stanchion has a movably mounted support arm.

Having moved the first rail bogie and semi-trailer into position relative the stanchion, the wheels of the trailer are secured to the platform. The wheels are secured to the platform of the rail bogie by entrapping the wheels between the chock assembly and the separate and independent front chock block means. In a preferred form of the invention, the separate and independent chock block means are longitudinally secured to the platform and chock assembly is longitudinally moved in a manner securing the trailer's wheels.

Thereafter, the trailer's landing legs are lowered onto the stanchion support arm after arm is positioned beneath the landing legs. The support arm of the stanchion will carry the weight of the front of the semi-trailer as distributed through its landing legs.

Thereafter, a second loaded rail bogie is moved toward the first rail bogie until the fifth wheel assembly on the second rail bogie lockably engages the kingpin on the trailer body in a manner forming the consist.

Other features and advantages of the present invention will become readily apparent from the following detailed description, appended drawings, and the accompanying claims.

BRIEF DESCRIPTION OF THE DRAWINGS

FIG. 1 is a side elevational view of a rail bogie constructed in accordance with the present invention, with a rear portion of a semi-trailer schematically represented thereon in broken lines;

FIG. 2 is a top plan view of the rail bogie illustrated in FIG. 1;

FIG. 3 is a fragmentary sectional view taken along line 3—3 of FIG. 2;

FIG. 4 is an enlarged top plan view of a chock assembly according to the present invention;

FIG. 5 is a front elevational view of the chock assembly illustrated in FIG. 4;

FIG. 6 is a right side elevational view of the chock assembly illustrated in FIG. 4;

FIG. 7 is a partial sectional view taken along line 7—7 of FIG. 4;

FIG. 8 is a partial sectional view taken along line 8—8 of FIG. 4;

FIG. 9 is a partial sectional view taken along line 9—9 of FIG. 4;

FIG. 10 is a partial sectional view taken along line 10—10 of FIG. 4;

FIG. 11 is a sectional view taken along line 11—11 of FIG. 8;

FIG. 12 is a longitudinal sectional view taken along line 12—12 of FIG. 11;

FIG. 13 is a top plan view of another chock block used in combination with the present invention;

FIG. 14 is a left side elevational view of the chock block illustrated in FIG. 13;

FIG. 15 is an enlarged fragmentary view of a portion of the chock block illustrated in FIG. 13;

FIG. 16 is a sectional view taken along line 16—16 of FIG. 15;

FIGS. 17-21 are schematic perspective views depicting sequential loading of a semi-trailer between a pair of rail bogies constructed in accordance with the present invention;

FIG. 22 is a perspective view of a stationary stanchion used during the loading process;

DETAILED DESCRIPTION OF A PREFERRED EMBODIMENT

Figure 23:
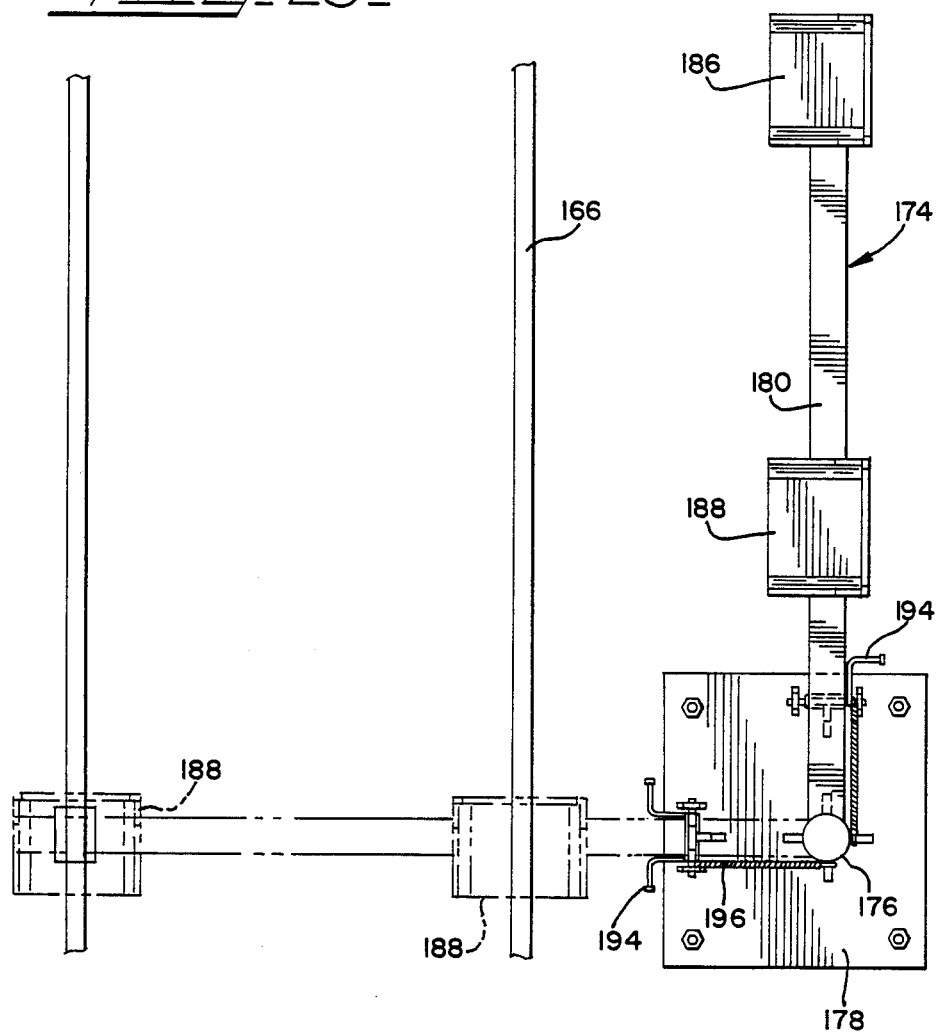
FIG. 23 is a top plan view of the stanchion illustrated in FIG. 22 shown in two positions.

While the present invention is susceptible of embodiment in various forms, there is shown in the drawings a presently preferred embodiment hereinafter described, with the understanding that the present disclosure is to be considered as an exemplification of the invention, and is not intended to limit the invention to the specific embodiment illustrated.

Referring now to the drawings wherein like reference numerals indicate like parts throughout the several views, the present invention concerns an intermodal system which permits railroads to transport truck trailers of any length. A salient feature of this system is a rail bogie 10.

As seen in FIGS. 1 and 2, each rail bogie 10 includes a drop deck frame structure 12. The frame structure 12 defines a central drop deck section 14 having a stationary, longitudinally extending planar platform 16. Platform 16 defines an upper surface 18 and a longitduinally extending track 20 extending substantially coaxial with the longitudinal axis of frame structure 12. Frame structure 12 further defines end deck surfaces 22 and 24 arranged at opposite ends of deck section 14. Preferably, frame structure 12 is about 30 feet in length and about 9 feet in width. Platform 16 is disposed beneath end deck surfaces 22 and 24 and measures about 12 feet in length and about 9 feet in width.

Frame structure 12 is supported in a suitable manner above a pair of spaced apart wheeled axles 26 positioned below end deck surfaces 22 and 24. The planar platform 16 is disposed between axles 26. Wheeled axles 26 preferably include railroad wheels 28 of a standard twenty eight inch diameter, with the axles rotating within conventional roller bearing journal boxes 30 and suspended by conventional rail springs 32. Each rail bogie is further provided with suitable brake rigging, valves and reservoirs which conform to A.A.R./F.R.A. Standards. Standard A.A.R. type couplers 34 are provided at each end of frame structure 12.

At least one fifth-wheel assembly 36 is secured to one end deck surface 22 or 24. The specific configuration of the fifth wheel does not form an integral part of the present invention. Preferably, the fifth-wheel assembly 36 is of a fixed height.

As seen in FIG. 3, central drop section 14 is of a box beam configuration providing the desired degree of rigidity to the frame structure. More specifically, the central drop section 14 includes platform 16 having one or more cross bolsters 38 and sidewalls 40 all of which are securely welded to each other to provide what is, in effect, a sturdy load-bearing beam. As illustrated in FIG. 3, platform 16 is provided with a longitudinally extending slot which defines track 20.

Each rail bogie 10 is further provided with a trailer securement system. The trailer securement system of the present invention comprises a chock assembly 42 and at least two separate and independent chock blocks 44 and 46. As seen in FIGS. 1 and 2, chock assembly 42 is securable to platform 16 and is normally arranged on one side of the rubber-tired wheels of a truck trailer. The chock blocks 44 and 46 are each securable to platform 16 and are both arranged on the opposite side of the rubber-tired wheels of the truck trailer.

As best illustrated in FIGS. 4 and 5, chock assembly 42 includes a transversely spaced pair of joined chock blocks 48 and 50. As illustrated, the chock blocks 48 and 50 are joined by a transverse beam structure 52. Intermediate the chock blocks 48 and 50, the chock assembly 42 is provided with an apparatus 54 for positioning the chock assembly relative to the platform 16. Alternatively, chock assembly could be arranged on a pivotable and translatable plate disposed between the chock assembly 42 and platform 16. Chock assembly 42 is preferably about 9 feet in width.

As seen in FIG. 4, the chock blocks 48 and 50 of the chock assembly 42 are substantially identical in structure except that they are mounted on opposite sides of the chock assembly. Because chock blocks 48, 50 are substantially identical, only the details of chock block 48 will be discussed with the understanding that chock block 50 may be similarly constructed.

As seen in FIG. 4, each chock block includes two transversely spaced, substantially parallel side panels 56 and 58 defining inner and outer rub rail members. Each rub rail member is secured to the beam structure 52. Moreover, each rub rail member laterally extends away from beam structure 52 for a distance of about two feet. In a preferred form, the distal end of each rub rail member flares outwardly to enhance guiding of the trailer's wheels into the chock assembly 42.

The outer rub rail member 56 on chock block 48 and the outer rub rail member 56' on chock block 50 are transversely spaced to guide a trailer's standard one hundred two inch tandem axle into the chock assembly by aligning the outside sidewalls of the two outer trailer tires. The inner rub rail member 58 on chock block 48 and the inner rub rail member 58' on chock block 50 are transversely spaced apart to guide a trailer's standard ninety six inch tandem axle into the chock assembly 42 by aligning the inner side walls of the inner two trailer tires. Disposed between the rail members 56 and 58 of each chock block is an upwardly extending, arcuate chuck plate 60 which is secured to each of the rub rail members. As seen in FIG. 10, chuck plate 60 is further supported by the beam structure 52.

In a preferred form of the invention, each chock block 48, 50 includes an operator-controlled assembly 62 for securing each end of the chock assembly 42 to the platform 16. Each securement assembly 62 is operable between engaged and released positions.

As seen in FIG. 6, each securement assembly 62 comprises an endwise movable lock pin 64 and an operator-controlled cammed handle 66. Intermediate its ends, lock pin 64 is linearly guided for endwise movement relative to its associated chock block by a pin retainer 68 secured to an outer surface of an outer rail member. The lowermost end of lock pin 64 is adapted to be received in an aperture or bore 70 defined by platform 16. In a preferred form of the invention, and as seen in FIG. 2, platform 16 defines a plurality of apertures or holes 70 arranged in a longitudially extended line of apertures, each of which are adapted to accommodate the lowermost end of lock pin 64.

Returning to FIG. 6, the opposite end of lock pin 64 passes through a pin guide 72 and is pivotally connected to the cammed handle 66. Like pin retainer 68, guide 72 is secured to an outer surface of an outer rail member. Cammed handle 66 and guide 72 cooperate together to control displacement of the lowermost end of the lock pin 64 relative to the platform 16. As a function of the disposition of handle 66, the lowermost end of lock pin 64 may be either engaged with platform 16 in a manner locking the chock assembly 42 against displacement relative platform 16 or disengaged with platform 16 in a manner allowing chock assembly 42 to move relative to the platform 16.

In its preferred form, and as seen in FIGS. 8 and 11, chock assembly positioning apparatus 54 includes a guide shoe 74 and guide shoe pin 76. The guide shoe 74 has an inverted "T" shaped configuration the center leg of which is accommodated for sliding movement in the longitudinally extended track 20. As best illustrated in FIG. 8, one end of a guide shoe pin 76 is accommodated in an aperture 80 defined by guide shoe 74. The free end of pin 76 extends upward through a slot 81 defined at the free end of a turn plate 82. The opposite end of turn plate 82 is secured to beam structure 52 of chock assembly 42. The free end of pin 76 is threadably engaged with a nut 84. By such construction, turn plate 82 is entrapped between nut 84 and guide shoe 74 in a manner securing the chock assembly 42 to platform 16 but permitting relative planar rotation relative thereto. Such construction further assures that the chock assembly 42 and, thereby, chock blocks 48, 50 will not become detached from the platform 16.

As seen in FIG. 11, the opposed ends of slot 81 in turn plate 82 define positive limit stops for the chock assembly 42. When each securement assembly 62 on the chock assembly 42 is released, chock assembly 42 is permitted free planar pivotal movement on the platform 16 through an arc of movement defined by the extent of slot 81. Moreover, when each securement assembly 62 is released, the chock assembly is permitted to move along a predetermined longitudinal path defined by the track 20. Here again, the guide shoe 74 of the positioning apparatus 54 affects the extent of movement permitted chock assembly 42.

In a preferred form of the invention, chock assembly positioning apparatus 54 further includes an operator-controlled drive assembly 90 for drivably moving the chock assembly 42 with its joined pair of chock blocks 48 and 50 in either longitudinal direction. As illustrated in FIGS. 11 and 12, drive assembly 90 includes a bevel gear set comprising an engaging pair of beveled gears 92 and 94. Beveled gear 92 is connected to a transversely extending shaft 96 between two supports 98 and 100. As seen in FIG. 12, gear 92 is connected to the shaft as with a key or spline connection 102. Shaft 96 is journaled for rotation by the supports 98 and 100 which upwardly extend from turn plate 82. The ends of shaft 96 transversely extend in opposite directions through the beam structure 52. As seen in FIGS. 9 and 10, suitable apertures 101 are provided in the beam structure 52 to allow passage of shaft 96.

As seen in FIG. 4, each free end of shaft 96 extends beyond the outer rub rail member 56 of the respective chock blocks 48 and 50. Each free end of shaft 96 can be provided with a drive hub 104. Drive hub 104 defines a plurality of holes 106 radially extending from shaft 96 and a square drive 108 (FIG. 6) at its end for accommodating the squared end of a driver.

As best seen in FIGS. 7, 8 and 12, the other beveled gear 94 is rotatably mounted on the turn plate 82. Gear 94 is connected to one end of a rotatably mounted pinion 110. Gear 94 is connected to the pinion 110 as with a key or spline connection 112 (FIG. 12). A snap ring 128 prevents upward movement of gear 94 relative to pinion 110. The pinion 110 is journaled for rotation relative to the turn plate 82 by a bearing or bushing 114 accommodated within a stepped recess 116 defined by turn plate 82. A second bearing or bushing 118 is also provided on the pinion 110 at an axially spaced distance from the first bearing 114. A spacer 120 maintains the spacing between bearings 114, 118. A pinion gear 122 is provided at the other end of the pinion 110.

As best illustrated in FIGS. 8 and 12, pinion gear 122 is adapted for engagement with at least one stationary rack 124. As seen in FIG. 12, a rack bracket 126 secures rack 124 to a cross bolster 38 of the frame structure 112. Alternative forms of mounting the rack are within the spirit and scope of the present invention. Rack bracket 126 can also provide support for a guide bar 127 secured thereto. Guide bar 127 cooperates with bearing 118 in guiding the translatory movement of the chock assembly 42.

Chock blocks 44 and 46, arranged on opposite sides of the trailer's wheels are substantially identical in structure. In the preferred embodiment, both chock blocks 44 and 46 are pivotally secured to the platform 16 along one side of their respective structures. Because chock blocks 44 and 46 are substantially similar, only the details of chock block 44 will be discussed with the understanding that chock block 46 may be similarly constructed.

As seen in FIG. 13, chock block 44 includes a pair of transversely spaced members 130 and 132 defining inner and outer rub rail members. Members 130 and 132 normally extend longitudinally of platform 16 and are arranged substantially parallel relative to each other. In a preferred form of the invention, the distal end of each rub rail member flares outwardly to enhance guiding of the trailer's wheels into the chock blocks. Disposed between and joining members 130 and 132 is an upwardly extending, arcuate chuck plate 134.

Each chock block 44, 46 is pivotally secured to the platform 16. As seen in FIGS. 13, 15 and 16, the inner rub rail member of each chock block is provided with an apertured ear 136 transversely extending from the rub rail member 130 toward truck 20. A threaded fastener 139 is adapted to pass through the apertured ear 136 and be secured in a fixed chock pivot support 138 provided beneath and secured to the planar platform 16. By such construction, each separate and independent chock block 44, 46 is permitted to rotate about the vertical axis of fastener 139 on platform 16 without becoming detached therefrom.

The opposite rub rail member 132 of each chock block includes an operator-controlled assembly 140 for securing each chock block against planar relative motion on the platform 16. Each securement assembly 140 is operable between engaged and released positions.

As best seen in FIG. 14, each securement assembly 140 comprises an endwise movable lock pin 142 and an operator-controlled cammed handle 144. Intermediate its ends, lock pin 142 is linearly guided for endwise movement relative to its associated chock block by a pin retainer 146. The lowermost end of lock pin 142 is adapted to be received in an aperture or bore 148 defined by platform 16. The opposite end of lock pin 142 passes through a pin guide 150 and is pivotally connected to the cammed handle 144. Cammed handle 144 and guide 150 cooperate together to control displacement of the lowermost end of lock pin 142 relative to the platform 16. As a function of the disposition of the handle 144, the lowermost end of lock pin 142 may be either engaged with platform 16 in a manner locking the chock block against displacement or disengaged with platform 16 in a manner allowing chock block to pivotally move relative to the platform.

In accordance with this invention, a method of forming a consist comprised of a semi-trailer ST supported between first and second rail bogies 10 and 10', respectively, will now be described according to FIGS. 17 through 21. The semi-trailer ST is of conventional design including a trailer body 154 with a first end defined by left and right rubber-tired wheels 156 and 158 arranged on opposite sides of the trailer body. It will be understood that the trailer body can include one axle or tandem axles, depending on trailer design. As seen in FIG. 19, a second end of the trailer is defined by a pair of trailer landing legs 160, 162 and a kingpin 164 depending from the trailer body 154. Each rail bogie in the consist is endwise movable over a railway section 166.

Referring initially to FIGS. 17 and 18, the semi-trailer ST is initially loaded onto a rail bogie 10 such that the trailer body 154 is substantially aligned with a longitudinal axis of the frame structure 12 of the rail bogie 10. Wheels 156, 158 are arranged on the platform 16 and the second end of the trailer extends longitudinally past the end of the first rail bogie 10.

To accomplish loading of the trailer onto the rail bogie in the manner described includes the following steps. As seen in FIG. 17, the bogie 10 is initially positioned on the railway section 166 adjacent to a loading ramp 170 of a terminal area T with its drop deck section 14 arranged adjacent the ramp. The rail bogie may be moved into a position adjacent the ramp 170 through use of either a conventional railroad locomotive or a rubber-tired truck-tractor locomotive which, as will be described, serves a dual purpose and is generally indicated by reference numeral 172 in the drawings. The tractor used to move the semi-trailer ST preferably includes a hydraulically actuated fifth wheel assembly on the end opposite a cab and is provided with railroad couplers at its front and rear ends.

Preferably, during the loading sequence, the chock assembly 42 is arranged perpendicular to the loading ramp 170 as illustrated in FIG. 17. During trailer loading, the chock block 46 closest to the ramp 170 is preferably rotated at approximately a forty five degree angle bringing it out of the path of the wheels 156, 158 of the trailer ST.

Having prepared the rail bogie for loading, tractor 172 is disconnected from rail bogie 10 and is connected to the semi-trailer ST. The trailer ST is then driven rearwardly up the ramp 170 at an acute angle relative to the straight rail section 166. The rear wheels 156, 158 of the trailer are backed into the chock blocks 48 and 50 of the chock assembly 42. The chock assembly 42 facilitates simultaneous rotational movement of the trailer wheels 156, 158 through an arc on the platform 16 and translatory movement of the trailer wheels 156, 158 along a predetermined longitudinal path during semi-trailer loading.

In a preferred form of the invention, loading of the trailer ST can include the following intermediate steps. Having once positioned the rail bogie 10 adjacent the ramp 170, the driver takes sufficient steps to prevent the rail bogie 10 from moving endwise on the railway section 166. The rail bogie can be prevented from endwise movement by: either using a wheel retaining device at an appropriate end of the rail bogie; or, setting the air brakes on the rail bogie; or, setting a parking brake on the rail bogie.

The driver then returns to the tractor 172 and proceeds to back the trailer ST up the ramp which rises to the height of the deck section 14. The driver continues backing the trailer until the trailer wheels are received in the chock blocks 48 and 50 of the chock assembly 42. At such time, a hook (not shown), extendable from the rear axle of the trailer, is connected to the chock assembly 42.

The driver then releases whatever device or means used to lock the rail bogie 10 from endwise movement on the rail section 166. As illustrated in FIG. 17, the driver then proceeds to start what is known as a "jack knife" maneuver to rotate the trailer body 154 to bring it into line with that of the rail bogie 10. To maneuver the trailer in the manner described, the tractor 172 is turned in the opposite direction as he is backing up both the trailer ST and the rail bogie 10 together.

As seen in FIG. 19, having once aligned the trailer body 154 with the rail bogie 10, the next step involves moving the first rail bogie 10 and the semi-trailer ST until the trailer landing legs 160, 162 are positioned to be supported by a stanchion 174. Stanchion 174 is provided adjacent to the railway section 166 and, preferably, on the same side of railway section 166 as the ramp 160.

Figure 24:
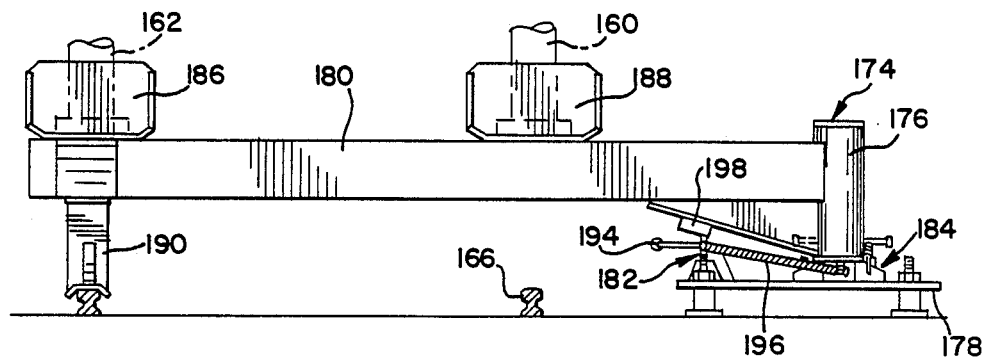
FIG. 24 is a front elevational view of the stanchion constructed in accordance with the present invention.

Stanchion 174 can take many forms. In its preferred form, and as seen in FIGS. 22–24, stanchion 174 includes a pivotal support 176 extending from a base 178 and having a cantilevered arm 180. Base 178 is securely arranged adjacent the railway section 166.

Base 178 includes two lock assemblies 182 and 184 arranged orthogonally with respect to each other on the base 178 for holding the stanchion arm 180 in either of two positions. Arm 180 includes two transversely spaced support members 186 and 188. Each support member 186, 188 is adapted to accommodate and support one depending trailer leg when arm 180 is pivotally moved from its solid-line position, illustrated in FIG. 23, to its "loaded" phantom-line position whereat it is ready to bear the weight of the trailer landing legs. Once locked in its "loaded" position, the stanchion 174 will not allow the trailer's landing legs 160, 162 to move. As best seen in FIG. 24, the distal end of arm 180 is provided with a depending leg or support 190. Leg 190 contacts the rail in rail section 166 farthest from the pivotal support 176. Thus, arm 180 supports the trailer's weight at two points.

Lock assemblies 182 and 184 each include a pivotal arm 192 which is pivotally secured to the base 178. An extension 194 may project transversely from the arm 192. A resilient member 196 or spring normally maintains the arm 192 in an upstruck position. A sear 198 is carried on the support arm 180 and is adapted to cooperate with the arm 192 in securing the stanchion in one of its two positions. By pressing downward on the projection 194, the lock is released in a manner allowing the stanchion to be displaced from one position to another.

Having positioned the rail bogie 10 and semi-trailer ST relative to stanchion 174, the next step in forming the consist involves securing the trailer's wheels 156, 158 on the platform 16 of the rail bogie 10 by entrapping the wheels 156, 158 between the chock assembly 42 and the separate and independent chock blocks 44 and 46.

The step of securing the trailer to the platform is effected by the operator braking the rail bogie 10 against endwise movement along rail section 166. As mentioned above, this end may be effected in a plurality of ways. Having once secured the rail bogie against endwise movement relative to the rail section 166, the trailer body is moved forward such that the wheels 156, 158 thereof engage the chock blocks 44 and 46. Because the trailer is temporarily connected to the chock assembly 42 through a hook, forward movement of trailer body 154 brings the chock assembly 42 forward therewith. The final positioning of chock assembly 42 may be effected manually through use of drive assembly 90 drivably moving the chocks 48 and 50 toward the opposite side of the trailer wheels 156, 158.

The next step in the method of forming a consist involves lowering the landing legs 160, 162 onto the stanchion's support arm 180 after the arm 180 is positioned beneath the landing legs 160, 162. The landing legs 160, 162 of the trailer are brought down as far as they will go (typically, about twenty inches). The fifth wheel assembly on the tractor 172 is then lowered until the sand shoes or bottom parts of the landing legs 160, 162 of the trailer rest on the stanchion's support arm 180. The driver then uncouples the tractor 172 from the trailer ST.

As seen in FIG. 20, the next step in the method of forming a consist involves moving a second loaded rail bogie 10' toward the first rail bogie 10 until a fifth wheel assembly 36' on the second rail bogie 10' lockably engages the kingpin 164 on the trailer body 154 in a manner forming the consist.

Before the second rail bogie 10' is connected to the first rail bogie 10, an empty rail bogie 10' is arranged relative the ramp 170 of the terminal area T and another semi-trailer ST is loaded in the same manner as described above. Thereafter, the second rail bogie 10' is moved along with the semi-trailer thereon into position for coupling with the first rail bogie 10. Ultimately, and as described above, the fifth wheel assembly 36' on the second rail bogie 10' lockably engages the kingpin 164 on the trailer body secured to rail bogie 10. When the coupling is positive, the landing legs 160, 162 on trailer body 154 of the first rail bogie are raised, just enough to take the weight off the rotating stanchion arm 180. Once this is done, the stanchion locking mechanism, holding arm 180 in place over rail section 166, is released and the arm 180 is rotated back to its resting position parallel to the track section 166. Once the hookup between rail bogies 10 and 10' is completed, the air brake hoses between rail bogies 10 and 10' are connected.

As seen in FIG. 21, the second rail bogie 10' is then pushed backward until the landing legs on the trailer body carried by the second rail bogie 10' are positioned to be supported by the stanchion arm 180. Thereafter, the stanchion arm 180 is again swung out and the landing legs are lowered from the second trailer body and the tractor is again uncoupled from rail bogie 10'. This procedure is repeated until all the trailers are loaded onto the consist.

The unloading procedure is quite nearly the reverse of the loading procedure and as such will not be dealt with here. Understandably, a person skilled in the art and the experience gained in first loading the consist will immediately make the unloading process, and many possible unthought variations, clear to the performance of these ends.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. In a system for transporting by rail a highway semi-trailer having rubber-tired highway wheels, said semi-trailer being supported between first and second rail bogies, each of said rail bogies comprising:
   a drop deck frame structure supported on wheeled axles positioned adjacent opposite ends thereof, said frame structure defining a central drop deck section having a stationary, longitudinally extended, planar platform defining an upper surface for supporting the wheels of said semi-trailer; and
   a trailer securement system comprising a chock assembly for facilitating simultaneous rotational movement of said semi-trailer's wheels through an arc on the platform and translatory movement of said wheels along a predetermined longitudinal path on the platform, said chock assembly including a transversely spaced pair of joined chock block means normally arranged on one side of said semi-trailer's wheels, with each of said chock block means including means for securing said chock block means relative to said platform in a manner securing said semi-trailer's wheels against movement in a first longitudinal direction, and means for positioning said chock assembly on said platform in a manner limiting movement of said chock assembly about a substantially vertical axis and along a predetermined longitudinal path; and, at least two separate and independent chock block means each of which having means for securing said separate and independent chock block means relative to said platform on an opposite side of said semi-trailer's wheels in a manner securing said semi-trailer's wheels against movement in a second longitudinal direction.

2. The invention as defined in claim 1 wherein said drop deck frame structure further defines end deck surfaces positioned above said wheeled axles.

3. The invention as defined in claim 2 wherein said planar platform is disposed beneath said end deck surfaces and between said wheeled axles.

4. The invention as defined in claim 2 wherein at least one of said end deck surfaces has a fifth wheel assembly supported thereabove.

5. The invention as defined in claim 1 wherein said chock assembly includes a transverse beam structure for joining said pair of chock block means secured to opposite ends thereof.

6. The invention according to claim 1 wherein each chock block means of said chock assembly includes a pair of transversely spaced, longitudinally extending members defining inner and outer parallel rub rail members.

7. The invention according to claim 1 wherein said securing means on each of said chock block means includes a resiliently biased pin which engages with a hole defined by said platform.

8. The invention according to claim 7 wherein said platform defines a plurality of holes in a longitudinally extended line.

9. The invention according to claim 1 wherein said positioning means includes a pivot pin which is slidably received in a longitudinally extending track defining the predetermined path of longitudinal movement of said chock assembly.

10. The invention according to claim 9 wherein said track is defined by said platform.

11. The invention according to claim 1 wherein said positioning means further includes means for drivably moving of said chock assembly with said joined pair of chock block means in either longitudinal direction.

12. The invention according to claim 10 wherein said driving means includes a rack and pinion arrangement.

13. The invention according to claim 12 wherein said rack and pinion arrangement includes operator-controlled means for longitudinally positioning said chock assembly on said platform.

14. The invention according to claim 10 wherein said positioning means further includes means for limiting rotation of said chock assembly relative to said platform.

15. The invention according to claim 10 wherein said rack is secured to said platform and said pinion is carried by said chock assemby.

16. The invention according to claim 1 wherein each separate and independent chock block means is pivotally secured to said platform.

17. The invention according to claim 1 wherein each separate and independent chock block includes a pair of transversely spaced, longitudinally extending members defining inner and outer parallel rub rail members.

18. The invention according to claim 1 wherein each of said rail bogies further includes a railroad car coupler at opposite ends of said frame structure.

19. A method of forming a consist comprising a highway semi-trailer supported between first and second rail bogies, each rail bogie being endwise movable over a railway section and having a central drop deck frame section defining a stationary platform, said semi-trailer having a trailer body with a first end defined by left and right rubber-tired wheels arranged on opposite sides of said trailer body and a second end having trailer landing legs and a kingpin depending from said trailer body, said method comprising the steps of:

(a) loading said semi-trailer onto said first rail bogie such that said trailer body is substantially aligned with a longitudinal axis of said frame section and has said wheels on said stationary platform with said second end longitudinally extending past an end of said first rail bogie, said first rail bogie including a rear chock assembly into which said wheels fit, said rear chock assembly facilitating simultaneous rotational movement of said wheels through an arc on the platform and translatory movement of said wheels along a predetermined longitudinal path during semi-trailer loading;

(b) moving said first rail bogie and said semi-trailer until said trailer landing legs are positioned to be supported by a stanchion provided adjacent said railway section, said stanchion having a movable mounted support arm;

(c) securing said wheels to said platform by entrapping said wheels between said rear chock assembly and separate and independent front chock block means, said front chock block means being longitudinally secured to said platform;

(d) lowering the landing legs onto the stanchion's support arm after said arm is positioned beneath said landing legs; and (e) moving said second rail bogie toward said first rail bogie until a fifth wheel assembly on said second rail bogie lockably engages the kingpin on said trailer body in a manner forming said consist.

20. The method according to claim 19 wherein loading said semi-trailer according to step (a) comprises the further step of positioning said first rail bogie with said central drop deck frame section on said railway section and relative to a terminal area with a ramp, said railway section extending along a substantially straight line path and adjacent said terminal area.

21. The method according to claim 20 wherein the loading of said semi-trailer comprises the further steps of:

moving the first end of said semi-trailer up the terminal area ramp at an acute angle relative to the railway section until said wheels fit into said rear chock assembly; and turning the trailer body into substantial alignment with the longitudinal axis of said frame section while simultaneously moving said first rail bogie and said trailer body.

22. The method according to claim 19 wherein said first rail bogie is held against moving relative said railway section until said wheels fit into said rear chock assembly.

* * * * *